US006210678B1

(12) United States Patent
Richards

(10) Patent No.: US 6,210,678 B1
(45) Date of Patent: Apr. 3, 2001

(54) REDUCTION OF PATHOGENIC BACTERIA IN FOOD PRODUCTS

(75) Inventor: Geoffrey N. Richards, Missoula, MT (US)

(73) Assignee: The University of Montana

( * ) Notice: Subject to any disclaimer, the term of this patent is extended or adjusted under 35 U.S.C. 154(b) by 0 days.

(21) Appl. No.: 09/159,902

(22) Filed: Sep. 24, 1998

Related U.S. Application Data

(60) Provisional application No. 60/059,871, filed on Sep. 24, 1997.

(51) Int. Cl.$^7$ .............................. A21D 4/00; A23L 3/36; A01N 65/00; C12N 1/00
(52) U.S. Cl. ................. 424/195.1; 426/335; 435/243
(58) Field of Search ................ 435/243, 252.1, 435/948, FOR 113, FOR 122; 536/1.11; 426/335, 531, 544, 634, 635, 658, 420, 442; 424/195.1

(56) References Cited

U.S. PATENT DOCUMENTS

| | | | |
|---|---|---|---|
| 1,047,592 | 12/1912 | Thomas | 406/335 |
| 1,925,819 | 9/1933 | Putnam et al. | 426/335 |
| 3,951,820 | 4/1976 | Jurd et al. | 252/1 |
| 3,955,005 | 5/1976 | Trelease et al. | 426/310 |
| 3,996,386 | 12/1976 | Malkki et al. | 426/321 |
| 4,044,160 | 8/1977 | Erickson et al. | 426/330 |
| 4,067,997 | 1/1978 | Kabara | 424/312 |
| 4,489,114 | 12/1984 | Bridgeford | 428/36 |
| 5,116,969 | 5/1992 | Adams et al. | 536/128 |
| 5,478,576 | 12/1995 | Jung et al. | 424/488 |
| 5,614,501 | 3/1997 | Richards | 514/22 |
| 5,756,098 | 5/1998 | Price et al. | 424/195.1 |
| 5,882,520 | 3/1999 | Richards et al. | 210/632 |
| B1 5,116,969 | 4/1997 | Adams et al. | 536/128 |

FOREIGN PATENT DOCUMENTS

| | | |
|---|---|---|
| 0357474 | 3/1990 | (EP) . |
| 0539235 | 4/1993 | (EP) . |
| 1074122 | 6/1967 | (GB) . |
| 633964 | 11/1978 | (SU) . |
| WO 94/13160 | 6/1994 | (WO) . |
| WO 98/11778 | 3/1998 | (WO) . |

OTHER PUBLICATIONS

A. Baldi et al., "Polyphenols from *Harungana madagascariensis*" 40$^{th}$ Annual Congress on Medicinal Plant Research, *Planta Medica,* 58 (Supplemental Issue 1), pp. A691–A692 (1992).

W. Grant–Thompson, "The Fiber Story" Chapter 6 in *Gut Reactions Understanding Symptoms in the Digestive Tract,* Plenum Press, NY, pp. 59–78 (1989).

M. Ito et al., "Effects of Transgalactosylated Disaccharides on the Human Intestinal Microflora and Their Metabolism," *J. Nutr. Sci. Vitaminol.,* 39: 279–288 (1993).

T. Okubo et al., "In Vivo Effects of Tea Polyphenol Intake on Human Intestinal Microflora and Metabolism," *Biosci. Biotech. Biochem.,* 56(4): 588–591 (1992).

M. Roberfroid, "Dietary Fiber, Inulin, and Oligofructose: A Review Comparing Their Physiological Effects," *Critical Reviews in Food Science and Nutrition,* 33(2): 103–148 (1993).

H. Yamada et al., "Advances in Cereal Chemistry and Technology in Japan: Structure and Properties of Oligosaccharides from Wheat Bran," *Cereal Foods World,* 38(7) 490–492 (1993).

K. Yawaza et al., "Search for Sugar Sources for Selective Increase of Bifidobacteria," *Bifidobacteria and Microflora,* 1(1): 39–44 (1982).

*Primary Examiner*—David M. Naff
*Assistant Examiner*—Deborah K. Ware
(74) *Attorney, Agent, or Firm*—Mueting, Raasch & Gebhardt, P.A.

(57) ABSTRACT

A composition is provided for reducing bacterial growth in food products. The composition includes a wood extract containing polyphenols and may contain arabinogalactan. The composition suppresses or prevents the growth of *E. coli* and of Salmonella sp. The wood extract imparts little or no residual taste to the food product. However, it can readily be removed if desired by washing before use of the food. The composition may be essentially arabinogalactan-free to further reduce bacterial growth.

15 Claims, 2 Drawing Sheets

REDUCTION OF PATHOGENIC BACTERIA IN FOOD PRODUCTS

STATEMENT OF RELATED APPLICATIONS

The present invention claims priority to U.S. Provisional Patent Application Ser. No. 60/059,871, filed on Sep. 24, 1997, which is incorporated herein by reference.

FIELD OF THE INVENTION

The present invention is generally in the area of methods and composition for reducing bacterial contamination in food products, such as meat.

BACKGROUND OF THE INVENTION

Commonly available products (such as chicken pieces, ground beef) as well as other foods (such as lettuce, sprouts) frequently carry bacterial pathogens such as *E. coli* and Salmonella sp. Contamination of chicken carcasses by Salmonella sp. during processing is a particularly common problem. The Salmonella sp. frequently originate as common constituents of the digesta in the lower GI tract of the birds. The bacteria can cause sickness when the product is consumed without adequate washing or cooking.

Methods used to destroy or reduce bacterial contamination other than washing or cooking typically involves the use of ultraviolet radiation or gamma sterilization. Additionally, even freezing frequently does not decrease the level of bacterial contamination. Decontamination is therefore not typically practical under ordinary conditions, and the food can be recontaminated shortly after sterilization.

Current methods for preventing food poisoning are therefore chiefly based on maintenance of good hygiene during food processing. Break downs in sanitation procedures have frequently resulted in sale of food products containing pathogenic bacteria with subsequent infection of consumers.

SUMMARY OF THE INVENTION

It is therefore a purpose of this invention to destroy or reduce bacterial growth during processing of the food and/or to suppress growth of such bacteria during food storage.

The present invention involves compositions including polyphenols, preferably obtained from extracts of larch wood (Larix), most preferably using only water extraction, heating and compression of the wood, used to treat meat and other food products to reduce spoilage of the food product due to bacterial contamination, especially of pathogenic bacteria, such as *E. coli* and Salmonella sp. An advantage of the polyphenol mixture is that it can be applied as a solution, for both immediate reduction in bacterial load as well as for lowering subsequent bacterial infection.

One aspect of the present invention provides a method for decreasing bacterial contamination in a food product. The method includes applying to the food an effective amount of a composition including a wood extract including polyphenols to reduce bacterial growth on the food, i.e., bacterial growth that can be on the exterior surface of the food or contained within the food itself. The composition may further include arabinogalactan.

Preferably, the wood extract is present in the composition in an amount from about 1% solids to about 25% solids. In another embodiment, the composition is essentially arabinogalactan-free. By "essentially arabinogalactan-free" it is meant that the wood extract included in the composition contains about 1% or less of arabinogalactan. In this instance, the wood extract is preferably present in the composition in an amount from about 0.01% solids to about 5.0% solids.

Preferably, the extract is obtained from a wood of Larix genus. Typically, the composition is an aqueous solution of the extract. Alternatively, the composition can be applied as a powder to the food.

The composition may be applied to the food product by mixing the composition with the food so that it is retained with the food in an amount effective to reduce bacterial growth. Alternatively, the composition can be applied using a technique selected from the group consisting of spraying, dipping, rinsing, brushing, or a combination thereof.

In accordance with the present invention, the food product can be selected from the group consisting of meat, eggs, vegetables, fruit, or a combination thereof.

Another aspect of the present invention provides a composition for reducing the viable bacterial content of food comprising a composition comprising a wood extract of polyphenols. The wood extract is preferably present in the composition in an amount from about 1% solids to about 25% solids. If the composition is essentially arabinogalactan-free, the extract is preferably present in the composition in an amount from about 0.01% solids to about 5.0% solids.

Yet another aspect of the present invention provides a food including an effective amount of a composition comprising polyphenols to reduce bacterial growth on the food. The composition may further include arabinogalactan in an amount effective to increase the growth of bifidobacteria following ingestion. Alternatively, the composition can be essentially arabinogalactan-free.

A composition in accordance with the present invention suppresses or prevents the growth of *E. coli* and of Salmonella sp. Additionally, the composition including a wood extract imparts little or no residual taste to the food, but can readily be removed if desired by washing before use of the food.

DETAILED DESCRIPTION OF THE INVENTION

Figure 1:
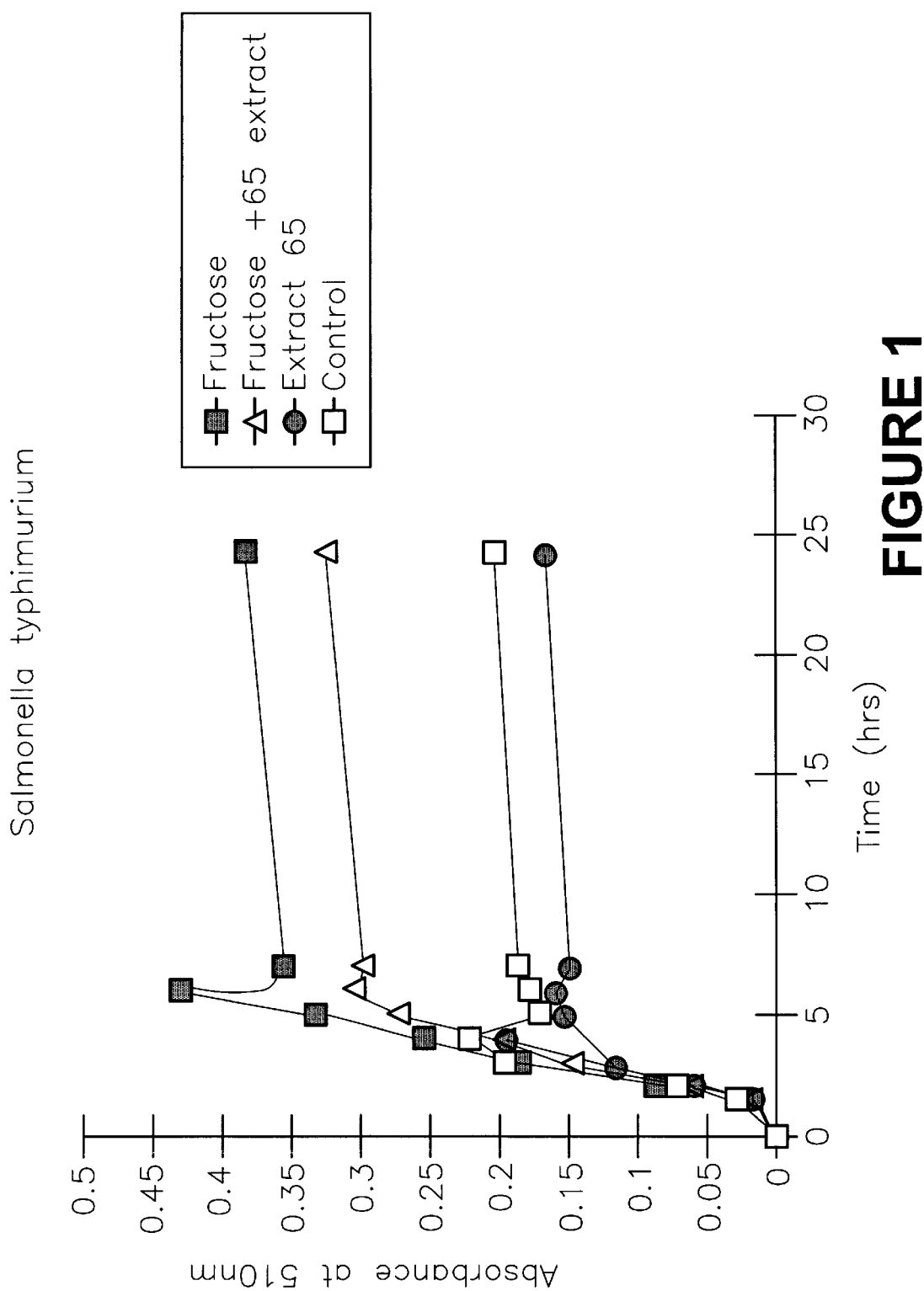
FIG. 1 is a graph of bacterial growth (*Salmonella typhimurium*) over time (hours), in the presence of added fructose (dark squares), fructose and larch wood extract (open triangle), larch wood extract (dark circle), and control (open square).

Polyphenols (especially flavonoids, for example, compounds with a phenyl-$C_3$-phenyl structure, wherein the phenyl rings are functionalized with one or more hydroxy groups) derived from green tea have been reported to significantly decrease the amount of *Clostridium perfrigens* and other Clostridium spp. (putrefactive bacteria), and significantly increase the amount of Bifidobacterium spp. (acid forming bacteria) in human feces. Okubo, T., et al., *Biosci. Biotech. Biochem.*, 56(4):588–591 (1992). As used herein, "polyphenols" are defined as molecules with two or more phenol moieties. Useful polyphenols include flavonoids, such as tannins, aromadendrines, anthocyanins, catecholins, catechins and taxifolins.

Preferred polyphenols are those that are extracted from plant materials from the Larix genus. For example, taxifolin is one preferred polyphenol because it is found in the Larix tree, which also contains arabinogalactan, a preferred polysaccharide.

As used herein, an arabinogalactan is defined as a polysaccharide containing a β-(1,3)-linked galactan backbone with side chains containing arabinose and galactose. Preferably, the average molecular weight is between 3,000 and 2,500,000, and more preferably, between 3,000 and 100,000. Preferred arabinogalactans are those derived from trees of the Larix genus. Preferably, the ratio of arabino groups to galactose groups is between 0.1:1 and 1:1. As used herein, "arabinogalactan" includes purified as well as impure extracts of larch wood and other sources of arabinogalactan.

Preparation of Wood Extract

In a typical process for preparing wood extract useful in the present invention, wood from a tree of the genus Larix, for example, *Larix occidentalis* (Western Latch), is chipped or pulverized. The wood is then extracted with warm water. Polyphenols, including taxifolins, and arabinogalactan are extracted by this process. The presence of polyphenols is preferred, because the polyphenols can also be useful for treating gastrointestinal disorders. See, e.g., U.S. Pat. No. 5,614,501 (Richards). The process can be optimized for maximum extraction of polyphenols by increasing the water temperature and/or by raising the pH to between 7 and 12 by adding a base such as ammonia, or sodium, calcium or potassium hydroxide.

An exemplary process for the extraction of polyphenols is described in U.S. Pat. No. 5,756,098 (Price et al.). Briefly, the process can be described as an on line process in which larch wood (Genus Larix) is essentially heated and compressed to yield an extract (also referred to herein as "larch extract"). Typically, larch extract includes dissolved solids which contain about 85% arabinogalactan and about 10% of a mixture of polyphenols. The extract, after membrane filtration and concentration, is available on a large scale. It is to be understood that polyphenol compositions that are substantially similar to those found in extracts of wood are contemplated as equivalents to the wood extracts that include polyphenols, regardless of whether the substantially similar compositions were actually extracted from wood.

For example, different plant species produce different polyphenols having differing structure, amount and proportion. A discussion of plant polyphenols is found in Scalbert, "Quantitative Methods for the Estimation of Tannins in Plant Tissues", in *Plant Polyphenols,* R. W. Hemingway and P. E. Laks, Eds., Plenum Press, New York, 1992, pp. 259–280. The content of polyphenols, and the type of polyphenols obtained in a plant extract, depend upon the plant source. As indicated above, polyphenols obtained in an extract of wood of a tree of the genus Larix are characterized in having an unusually high taxifolin content, since the primary polyphenol found in Larix wood is taxifolin. In contrast, while some trees have taxifolin in their bark, taxifolin is not generally abundant in the wood of trees of other genera. Hara et al., *J. Vet. Med. Sci.,* 57:45–49 (1995), discloses that green tea polyphenols have had bactericidal effects, and that polyphenols which are present in tea include gallocatechin and epicatechin gallate. However, Hara et al. does not suggest that taxifolin is present in green tea, or has a bactericidal effect, much less that an extract of a tree of the genus Larix could inhibit the growth of harmful bacteria such as Clostridia. Thus, as indicated by the disclosure of Hara et al., the art has not recognized that an extract of wood of a tree of the genus Larix including arabinogalactan and Larix polyphenols could be useful for inhibiting the growth of harmful bacteria such as Clostridia.

Compositions for Reducing Bacterial Growth

A polyphenol extract can be formulated as a powder by drying the extract using standard technology or can be used as an aqueous solution for treatment of the foods. The arabinogalactan can optionally be removed from the extract before the extract is used to treat the foods. Removal of the arabinogalactan can be accomplished by conventional precipitation techniques, for example, using ethanol, isopropanol, and the like.

Food products, such as chicken and beef carcasses or vegetable produce are treated with the extract by applying an aqueous composition including the extract, preferably sterile. Preferably, applying the composition is a technique selected from the group consisting of dipping, spraying, brushing, or a combination thereof. A composition in accordance with the present invention reduces the viable bacterial content of food, i.e., reduces the population of bacteria that may be capable of growth when cultured on appropriate media. For example, meat treated with a composition including 5% solids of a wood extract, as described above, was effective to reduce the potential to produce colony forming units in the meat about 30–70%, as compared to untreated meat.

The composition may include various concentrations of the extract. For example, the extract can be present in the composition in an amount preferably up to about 25% solids, and more preferably from about 10% solids. The extract can be present in the composition in an amount as low as about 1% solids, and more preferably about 2% solids. Ground meats may be admixed with the extract. In one embodiment, applying the composition includes dipping or spraying the food product with an aqueous extract of a wood. The extract imparts little or no residual taste to the food, but can readily be removed if desired by washing before use of the food.

The reduction of pathogens by treatment of the food products with arabinogalactan can be made more efficient by removing the arabinogalactan by precipitation from the arabinogalactan (e.g. with ethanol). Thus, the composition is essentially arabinogalactan-free, i.e., the extract contains about 1% or less of arabinogalactan. The solution can be used either directly or after evaporation to dryness and redissolving in water to treat food products in the same way described for arabinogalactan. It has been found that the polyphenols, after removal of arabinogalactan, are more efficient in protection of food products against bacterial pathogens. While not wishing to be bound by any particular theory, it is believed that this may be due to the arabinogalactan acting as a nutrient for some pathogens under certain conditions.

Furthermore, the removal of the arabinogalactan may also result in a reduced requirement in the amount of polyphenols required to suppress the bacterial pathogens. An aqueous composition including the polyphenols of relatively low concentration typically suffices to suppress the growth of bacterial pathogens on food products. For example, the extract that is essentially arabinogalactan-free is preferably utilized in an amount up to about 5% solids, and more preferably up to about 2% solids. Even more preferably, the extract that is essentially arabinogalactan-free can be utilized in an amount preferably as low as about 0.5% solids, and still more preferably about 0.01% solids. It is further believed that treatment of the food by applying a composition that is essentially arabinogalactan-free is made more effective because the aqueous composition of the polyphenols has surfactant characteristics, thus wetting the surfaces of the food very efficiently.

A composition according to the invention may also include an optional additive so long as the optional additive does not have any adverse affects on the food product to which the composition is to be applied. Such adverse affects could include a change in the food color to an unpleasing color, an unappetizing taste, and the like. Suitable optional additives can be selected from the group consisting of a sweetening agent such as sucrose or saccharin; a flavoring agent (e.g., methyl salicylate), colorants, vitamin or mineral supplements, and a combination thereof.

Methods of Treatment

Food products are treated with compositions according to the present invention to suppress growth of any pathogenic bacteria already present and to reduce the possibility of subsequent viable infection by such bacteria. The food products could be either sprayed with, dipped into, or brushed with a suitable dilution of the composition before packaging. If so desired, the products could subsequently be washed with water before further preparation.

The composition in accordance with the present invention may be in the form of a dry powder that can be sprinkled on or mixed in with the food product. The composition in the form of a dry powder may include an additive such as microcrystalline cellulose, gum tragacanth, gelatin, starch, lactose, alginic acid, Primogel, or corn starch (which can be used as a disintegrating agent).

The present invention will be further understood by reference to the following non-limiting examples.

EXAMPLE 1

Inhibition of Bacteria In Vitro Using Larch Extract

In vitro cultures have shown that larch extract at 0.5% concentration completely suppresses the growth of *E. coli* and of *Salmonella typhimurium*, respectively. Even in the presence of a good nutrient for both bacteria (viz. fructose), the growth rates of the bacteria are significantly reduced by the extract.

Figure 2:
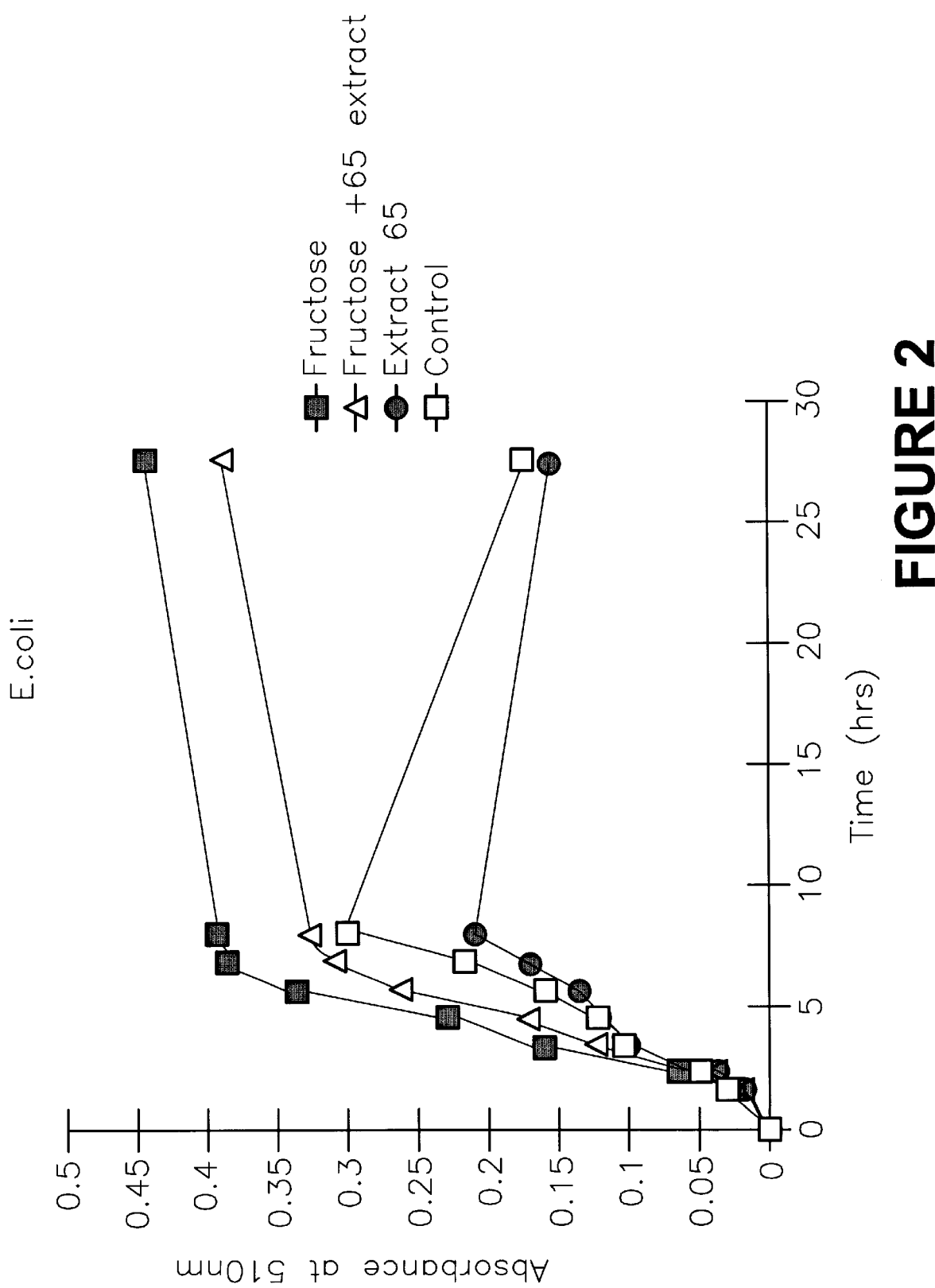
FIG. 2 is a graph of bacterial growth (*E. coli*) over time (hours), in the presence of added fructose (dark squares), fructose and larch wood extract (open triangle), larch wood extract (dark circle), and control (open square).

FIGS. 1 and 2 show the growth of *E. coli* and of *Salmonella typhimurium* in anaerobic liquid culture with 0.5% additives. Each curve represents the average of 3 experiments. "Extract 65" is a hot water extract of *Larix occidentalis* wood with the composition described in the disclosure.

The growth curves show that for both bacteria:
a) Growth is suppressed by the extract, compared with the control with no additive. Under these conditions, therefore, the arabinogalactan in the extract does not function as a substrate for growth of the bacteria.
b) Even in the presence of a good growth substrate (fructose) the polyphenol components of the extract still significantly retard growth of both bacteria.

EXAMPLE 2

Inhibition of Bacteria by Arabinogalactan in Combination with Polyphenols

Both ultrarefined arabinogalactan and Stractan 10, a Larch tree extract including arabinogalactan and polyphenols, support the growth of Bifidobacteria in culture. Imamura et al., *Bifidus-Flores, Fructus et Semina,* 6:19–29 (1992) discloses that intestinal bacteria of rats and humans, including *Bifidobacterium longum,* can metabolize arabinogalactan from Larch. Thus, arabinogalactan from Larch can support the growth of beneficial bacteria such as Bifidobacteria. Other studies have shown that polyphenols extracted from a tree of the genus Larix reduce the growth of harmful bacteria such as Clostridia while permitting the growth of Bifidobacteria.

Larch wood extracts containing both arabinogalactan and polyphenols can concurrently promote the growth of beneficial bacteria, such as Bifidobacteria, and reduce the growth of harmful bacteria such as Clostridia. Thus, an extract derived from wood of a tree of the genus Larix, which includes arabinogalactan and polyphenols, may be applied to food to concurrently promote the growth of beneficial bacteria and to reduce the growth of harmful bacteria after consumption of the food.

These studies were conducted as follows.

An inoculum of *Bifidobacterium thermophilum* was added to 10 ml of reinforced clostridial agar (RCA) broth, placed into an anaerobe Gas Pak and incubated at 37° C. until sufficient growth was detected. The cells were washed and centrifuged three times in a saline solution. The cells were then diluted to an optical density of 0.200 at 510 nm, approximately $1 \times 10^6$ cells/ml. 0.5 mls of live cells were placed into test tubes containing RCA broth (5 ml) and 0.25 mg ultrarefined arabinogalactan, designated LAREX UF available from Larex, International, St. Paul, Minn.). Other tubes containing only the broth and arabinogalactan were not inoculated and were used as controls. A stop cock was then placed on each test tube and evacuated for 2.5 min. The stop cocks were closed and the tubes incubated at 37° C. with optical density at 510 nm being measured at intervals.

Results for three samples indicate that the bacteria grew well on the arabinogalactan.

This procedure was repeated with Stractan 10 in place of the pure arabinogalactan. Stractan 10 (St. Regis Paper Company, Tacoma, USA, or Sigma, St. Louis, USA) is a mixture of arabinogalactan and about 8% polyphenols isolated from Western Larch.

The results indicate good growth of the bacterium on the mixture of arabinogalactan and polyphenols. In one of three tubes there was an extended lag phase before growth commenced.

EXAMPLE 3

Examination of the Growth of Six Species of Bifidobacterium on Arabinogalactan from Western Larch in Pure Form and Containing Larch Polyphenols The bacteria grown on freshly prepared RCA 1.35% agar plates (containing 0.5% fructose) were suspended in 10 ml of RCA broth containing either 0.5% fructose, or 0.5% Stractan 10 or 0.5% ultrarefined arabinogalactan. A control of RCA broth containing no carbon source was also run. The tubes were then placed in a Gas Pak and incubated at 37° C. The growth of bacterial cultures was determined by turbidity. The sign (+) indicates apparent growth on the arabinogalactan sample similar to that observed on fructose.

Purity of bifidobacteria was determined via light microscopy of gram stained organisms and RCA plates containing the chromogen x-á-gal by Chevalier, et al., *J. Microbiol. Methods,* 13, 75–83 (1991). The results are shown in Table

1.

TABLE 1

Determination of Growth of Bifidobacterium on Arabinogalactan Carbon Sources.

|  | Stractan 10 | Pure Arabinogalactan |
|---|---|---|
| B. pseudolongum (ATCC 25526) | + | + |
| B. thermophilum (ATCC 25525) | + | + |
| B. breve (ATCC 15700) | − | − |
| B. pullorum (ATCC 27685) | − | − |
| B. bifidum (ATCC 11863) | − | − |
| B. adolescentis (ATCC 15703) | − | − |

EXAMPLE 4

Inhibition of the Growth of Clostridium perfringens by Hot-water Soluble Polyphenols from Larix occidentalis The hot-water soluble polyphenols, together with arabinogalactan "AG" were obtained by extraction of chips of Western Larch with water at 65° C. for 24 hrs ("the extract"). The extract contained AG (87%) and polyphenols (8%, of total dissolved solids).

Clostridium perfringens were obtained in lyophilized form from the American Type Culture Collection (ATCC, Rockville, Md.). The bacteria were grown on Reinforced Clostridial Agar (RCA) (Atlas, 1993) which contained (g/l) :agar, 13.5; beef extract, 10; NaCI, 5.0; fructose, 5.0; yeast extract, 3.0; sodium acetate, 3.0; L-cysteine, 0.5. Purity of *Clostridium perfringens* was determined via light microscopy of gram-stained organisms.

Isolated colonies of the bacteria grown on freshly prepared RCA 1.35% agar plates (containing 0.5% fructose) were suspended in RCA broth. After 6–8 hrs of incubation at 37 ° C. in an anaerobic chamber, the cells were washed and centrifuged (3500 rpm/4 min) three times in a phosphate saline buffer solution (pH=6.5), diluted to a final turbidity of 0.200 at 510 nm ($1\times10^6$ cells/ml) and used as inoculum. 0.5 ml of inoculum was added to a screw cap test tube containing 5.0 ml of freshly prepared RCA broth supplemented with 0.05% of the appropriated carbon source: fructose; ultrarefined arabinogalactan; and control with no carbon source; the extract; or the extract plus fructose. The growth of bacterial cultures was followed by absorbance at 510 nm. The results indicate that *Clostridium perfringens* is unable to metabolize arabinogalactan. Growth on fructose was evaluated as a model of optimum growth. The small amount of growth obtained by the *C. perfringens* on arabinogalactan can be attributed to compounds present in the medium. Growth was inhibited by the 65° C. extract. Thus the Larch tree extract including arabinogalactan and polyphenols inhibited the growth of the pathogenic bacterium, *Clostridium perfringens.*

EXAMPLE 5

Reduction of Pathogen Growth in Chicken and Beef Infected with *E. coli* and *Salmonella typhimurium*

A sample of raw chicken and a sample of raw beef were each infected by immersion of the meat in aqueous culture of *E. coli* at $2\times10^8$ cfu/ml. A separate sample of raw chicken and a sample of raw beef were each infected by immersion of the meat in an aqueous culture of *Salmonella typhimurium* at $5\times10^8$ cfu/ml.

The extract utilized was extracted from wood of the Larix genus as described in U.S. Pat. No. 5,756,098 (Price et al.).

The contaminated meat was divided into three parts. One part was rinsed in water (as a control). A second part was rinsed in an aqueous solution of a polyphenol extract that was diluted to 5% solids. A third part was rinsed in an aqueous solution of a polyphenol extract that was essentially arabinogalactan-free that was diluted to 1% solids. The arabinogalactan was removed by ethanol precipitating the polyphenol extract from Larex genus.

The infected and rinsed meat was kept a room temperature and examined to determine the "spoilage." Spoilage was determined by vigorously washing the meat sample with sterile saline by simply submersing the meat for 5 min. Serial dilutions were made of the saline wash in fresh saline. Aliquots of each serial dilution were then plated out on trypticase soy agar plates and held at 37° C. for 1 to 2 days. Although results can be expressed as colony forming units (cfus) per gram of meat, the results were summarized qualitatively in the table below.

TABLE 2

| Sample | Results |
|---|---|
| *E. coli* infected beef | Cfu's for the beef rinsed with extract composition reduced about 30–70% as compared to the control beef rinsed in just water after incubation of the infected beef from 2–20 hours at room temperature. Results were similar for the beef rinsed in the essentially arabinogalactan-free composition. |
| *E. coli* infected chicken | Cfu's for the beef rinsed with extract composition reduced about 30–50% as compared to the control chicken rinsed in just water after incubation of the infected chicken from 4–6 hours at room temperature. Results were similar for the chicken rinsed in the essentially arabinogalactan-free composition after incubation of the infected chicken for 6 hours. |
| *S. typhi.* infected beef | Cfu's for the beef rinsed with extract composition reduced about 34% as compared to the control beef rinsed in just water after incubation of the infected beef from 4 hours at room temperature. Cfu's for the beef rinsed with extract composition reduced about 55% as compared to the control beef rinsed in just water after incubation of the infected beef from 6 hours at room temperature. |
| *S. typhi.* infected chicken | The reduction in cfu's in the chicken rinsed with extract composition and for the chicken rinsed in the essentially arabinogalactan-free composition was significant after incubation of the infected chicken for 2–6 hours. |

Patents, patent applications, and documents disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A method for reducing food spoilage comprising: applying to a food an effective amount of a composition comprising a wood extract obtained from a wood of Larix genus comprising flavonoids; wherein the composition is effective to reduce at least the growth of bacteria selected from the group consisting of *E. coli,* Salmonella, Clostridium and combinations thereof on the food under conditions of storage that allow growth of the bacteria when the composition is not present; and storing the food under conditions that would have resulted in spoilage of the food by the bacteria when the composition is not present.

2. The method of claim 1 wherein the composition further comprises arabinogalactan.

3. The method of claim 1 wherein the wood extract is present in the composition in an amount from about 1% solids to about 25% solids.

4. The method of claim 1 wherein the composition is essentially arabinogalactan-free.

5. The method of claim 1 wherein the extract is present in the composition in an amount from about 0.01% solids to about 5.0% solids.

6. The method of claim 1 wherein the composition is an aqueous solution of the extract.

7. The method of claim 1 wherein the composition is applied as a powder to the food.

8. The method of claim 1 wherein applying the composition comprises mixing the composition with the food so that it is retained with the food in an amount effective to reduce bacterial growth.

9. The method of claim 1 wherein applying is a technique selected from the group consisting of spraying, dipping, rinsing, brushing, and a combination thereof.

10. The method of claim 1 wherein applying comprises mixing the composition with the food product.

11. The method of claim 10 wherein the food product is selected from the group consisting of meat, eggs, vegetables, fruit, and a combination thereof.

12. The method of claim 1 wherein the bacteria is selected from the group consisting of *E. coli, Salmonella typhimurium, Clostridium perfingens,* and a combination thereof.

13. A stored food prepared according to the method of claim 1.

14. The stored food of claim 13 wherein the extract further comprises arabinogalactan in an amount effective to increase the growth of bifidobacteria following ingestion.

15. The stored food of claim 13 wherein the composition is essentially arabinogalactan-free.

* * * * *

UNITED STATES PATENT AND TRADEMARK OFFICE
CERTIFICATE OF CORRECTION

PATENT NO. : 6,210,678 B1
DATED : April 3, 2001
INVENTOR(S) : Richards

It is certified that error appears in the above-identified patent and that said Letters Patent is hereby corrected as shown below:

Title page,
Item [54], delete "REPRODUCTION OF PATHOGENIC BACTERIA IN FOOD PRODUCTS" and replace with -- REPRODUCTION OF PATHOGENIC BACTERIA IN FOOD PRODUCTS DURING STORAGE BY ADDING AN EXTRACT FROM LARIX WOOD --.

Column 9,
Line 1, after "bacteria" insert -- , --.

Signed and Sealed this

Twentieth Day of August, 2002

*Attest:*

JAMES E. ROGAN
*Director of the United States Patent and Trademark Office*

*Attesting Officer*